United States Patent [19]

Imakoshi et al.

[11] Patent Number: 4,691,259
[45] Date of Patent: Sep. 1, 1987

[54] MAGNETIC TRANSDUCER HEAD UTILIZING MAGNETORESISTANCE EFFECT

[75] Inventors: Shigeyoshi Imakoshi; Munekatsu Fukuyama; Hideo Suyama; Yutaka Souda, all of Kanagawa, Japan

[73] Assignee: Sony Corporation, Tokyo, Japan

[21] Appl. No.: 769,937

[22] Filed: Aug. 27, 1985

[30] Foreign Application Priority Data

Aug. 27, 1984 [JP] Japan .................................. 59-177847
Oct. 5, 1984 [JP] Japan .................................. 59-209303

[51] Int. Cl.⁴ .......................... G11B 5/127; G11B 5/02
[52] U.S. Cl. ........................................ 360/113; 360/67
[58] Field of Search ........................... 360/113, 67, 66; 324/249

[56] References Cited

U.S. PATENT DOCUMENTS

| | | | |
|---|---|---|---|
| 3,979,775 | 9/1976 | Schwarz | 360/113 |
| 4,259,703 | 3/1981 | Young et al. | 360/113 |
| 4,280,158 | 7/1981 | de Niet | 360/113 |

OTHER PUBLICATIONS

IEEE Transactions on Audio–Mar./Apr., "Application of a Magnetoresistance Element to Magnetic Recording", (1965)–pp. 41–43.

*Primary Examiner*—Vincent P. Canney
*Attorney, Agent, or Firm*—Hill, Van Santen, Steadman & Simpson

[57] ABSTRACT

A magnetoresistance effect type magnetic head apparatus has a magnetoresistance effect sensing element, means for applying a bias magnetic field to the sensing element, a detecting circuit for obtaining a detecting signal, a low pass filter for deriving an unwanted signal component from the detecting signal, and means for applying a cancelling magnetic field to the sensing element so as to eliminate the unwanted signal component. An additional sensing element may also be provided to detect an external magnetic field, and a corresponding signal is generated which is applied to a first sensing element so as to cancel the effects of the external magnetic field.

17 Claims, 22 Drawing Figures

MAGNETIC TRANSDUCER HEAD UTILIZING MAGNETORESISTANCE EFFECT

RELATED APPLICATION

This application is related to U.S. Ser. No. 705,706, filed Apr. 26, 1985 by the same inventors of the instant application.

BACKGROUND OF THE INVENTION

The present invention relates to a magnetoresistance effect type magnetic head apparatus.

A magnetoresistance effect type (hereinafter referred to as "MR") magnetic head apparatus has a magnetic head element h as shown in FIG. 12. On a magnetic substrate 1 of Ni-Zn ferrite or MN-Zn ferrite, or through an insulating layer 2 of $SiO_2$ or the like on the substrate 1 if it is conductive, a bias conductor 3 is applied which provides a bias magnetic field generated by current passing therethrough to supply a bias magnetic field to a sensing element having the magnetoresistance effect (hereinafter referred to as "MR sensing element") as hereinafter described. The bias conductor 3 may be formed by a hand-shaped conductive film extending in one direction. An MR sensing element 5 comprising MR magnetic thin film of Ni-Fe alloys or NI-Co alloys is arranged over the bias conductor 3 on an insulation layer 4. A pair of magnetic layers 7 and 8 of Mo permalloy or the like as a magnetic core of a magnetic circuit are formed so that the magnetic layers 7 and 8 are positioned at each end over the MR sensing element 5 on a thin insulation layer 6, and extend across the bias conductor 3 and the MR sensing element 5. A protective substrate 10 is provided on the substrate 1 through a non-magnetic insulation protective layer 9. A front magnetic gap g is formed between one magnetic layer 7 and the front end of the substrate 1 through a non-magnetic gap spacer layer 11 comprising, for example, the insulating layer 6 having a required thickness. A front surface of the substrate 1, the gap spacer layer 11, the magnetic layer 7, the protective layer 9, and the protective substrate 10 are polished such that a surface 12 opposite a magnetic recording medium is formed, and wherein the magnetic gap g faces the medium. The rear end of the magnetic layer 7 which forms the magnetic gap g, and the front end of the other magnetic layer 8, are formed to ride on the MR sensing element 5 through the insulation layer 6, and both ends are spaced from each other by a discontinuous portion 13. The rear end of the magnetic layer 7 and the front end of the magnetic layer 8 are electrically insulated by interposition of the insulation layer 6 at both ends of the MR sensing element 5. They are, however, magnetically connected. The discontinuity portion 13 between both magnetic layers 7 and 8 is magnetically connected by the MR sensing element 5, so that a magnetic circuit is formed in a closed magnetic path around the substrate 1: the magnetic gap g - the magnetic layer 7 - the MR sensing element 5 - the magnetic layer 8 - the substrate 1.

In such a MR type magnetic head apparatus, a signal magnetic flux by a signal recorded on the magnetic recording medium flows from the magnetic gap g opposite the magnetic recording medium into the magnetic circuit. Thus a resistance value of the MR sensing element 5 in the magnetic circuit varies in response to the external magnetic field by the signal magnetic flux. Variation of the resistance value is detected as a voltage variation across the MR sensing element 5 and a sensing current $i_{MR}$ flows through the MR sensing element 5. Thus a reproduction of the recording signal on the magnetic recording medium is effected.

FIG. 13 shows a magnetoresistance characteristic curve of the MR sensing element. It is clear that the magnetoresistance characteristic curve of the MR sensing element 5 becomes a parabolic curve in a certain range of the magnetic field. Consequently, the sensitivity characteristics show a maximum value at two values of the magnetic field as shown in FIG. 14. A point of maximum sensitivity becomes also a point of good linearity. Consequently, in such a magnetic head, the bias magnetic field $H_B$ is applied with a nearly equal value to that supplying the maximum sensitivity to the MR sensing element 5. The bias magnetic field $H_B$ is supplied mainly by the external bias magnetic field $H_{BO}$ by a magnetic field induced by current flowing through the bias conductor 3. In actual practice, however, in addition to the magnetic field $H_{BO}$, the bias magnetic field $H_B$ is supplied also by the magnetic field $H_{MR}$ generated by sensing current $i_{MR}$ flowing internally through the MR sensing element 5. In such an MR type magnetic head apparatus as clearly seen in a schematic diagram of FIG. 15, the MR sensing element 5 is supplied with the generated magnetic field, while prescribed d.c. current $i_{BO}$ flows through the bias conductor 3. At the same time, prescribed sensing current $i_{MR}$ flows through the MR sensing element 5. In such a state, the MR sensing element 5 is supplied with the bias magnetic field $H_B$ formed of the magnetic field $H_{BO}$ generated by energizing the bias conductor 3 and the magnetic field $H_{MR}$ generated by the sensing current $i_{MR}$ flowing through the MR sensing element 5, the signal magnetic field $H_s$ being applied from the magnetic recording medium. A voltage across the MR sensing element 5 on the basis of resistance variation by the signal magnetic field $H_s$, i.e. a variation of potential at point A, is amplified by an amplifier 14 and detected at an output terminal 15. Numeral 16 designates a coupling capacitor.

In the MR type magnetic head apparatus as above described, the required bias magnetic field $H_B$ is applied to the MR sensing element. Thus, the working point is set with good sensitivity and linearity. However, if the magnetic head element in the MR type magnetic head apparatus is supplied with an undesirable external noise magnetic field $H_N$ other than the output magnetic field from the magnetic recording medium, for example a magnetic field generated from a motor or the like (hereinafter referred to as "external magnetic field"), a setting state of the magnetic field for the MR sensing element varies. Thus there is a variation of the sensitivity and linearity which causes generation of distortion and noise in the reproduction signal.

In the MR magnetic head element having characteristics as described in FIG. 13 and FIG. 14, if the external magnetic field $H_N$ of $H_N=0$ (Oe), $H_N=+10$ (Oe), $H_N=-10$ (Oe) is applied to the band-shaped MR sensing element in the width direction, the sensitivity characteristic curves are as shown in FIG. 16. In FIG. 16, the sensitivity characteristic curve of $H_N=0$ (Oe) does not pass through the origin, because, in addition to the magnetic field generated by current flowing through the bias conductor, i.e. the bias current $i_{BO}$, the magnetic field $H_{MR}$ by the sensing current $i_{MR}$ flowing through the MR sensing element affects it.

SUMMARY OF THE INVENTION

It is an object of the present invention to provide an MR type magnetic head apparatus where a shift of the working point of the MR sensing element caused by the external magnetic field can be avoided.

According to the present invention, there is provided an MR type magnetic head apparatus comprising a magnetoresistance effect sensing element, a bias conductor for applying a bias magnetic field to the sensing element, a magnetic head element unit for reproducing the recording signal on the magnetic recording medium, and means for detecting the external magnetic field and which is installed at a position near the magnetic head element unit but not adjacent the magnetic recording medium. Thus, current flowing through the bias conductor is controlled by the sensing current from the means for detecting the external magnetic field, and the prescribed bias magnetic field is normally applied to the MR sensing element.

DESCRIPTION OF THE PREFERRED EMBODIMENTS

Figure 1:
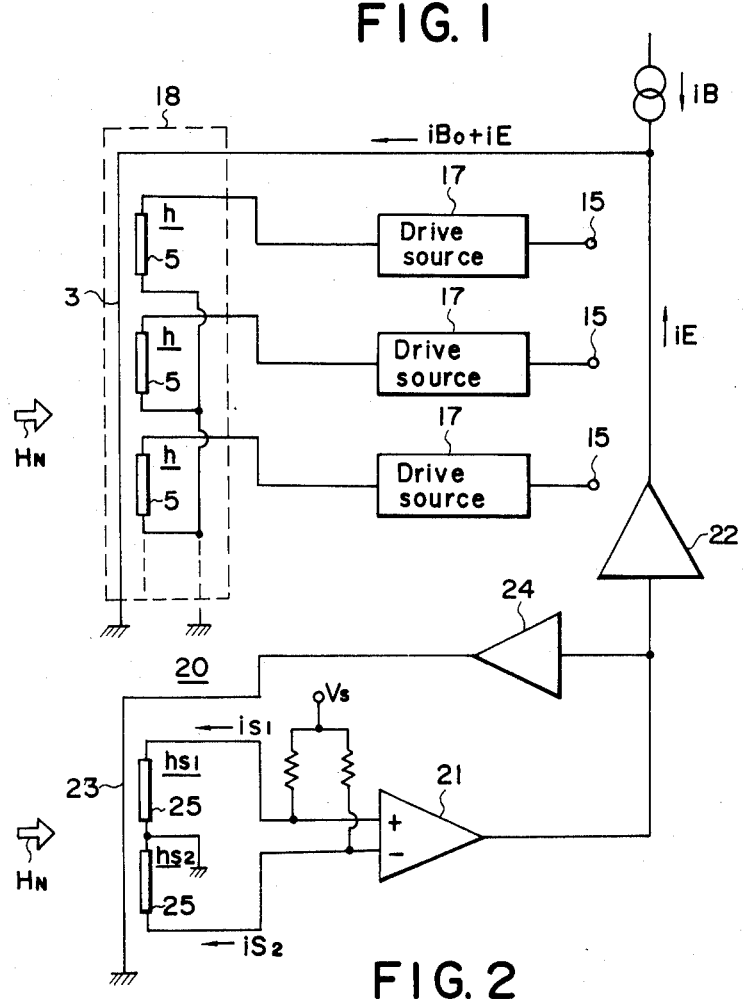
FIG. 1 is a diagram illustrating an MR type magnetic head apparatus in a first embodiment of the invention.

An MR type magnetic head apparatus, in a first embodiment of the invention, will now be described by referring to FIG. 1. In the embodiment, a magnetic recording medium has a plurality of data tracks thereon, and a multi-track magnetic head element unit 18 for reproducing data tracks is installed and formed of an arrangement of a plurality of MR magnetic head elements h to reproduce a signal magnetic field, i.e. a recording signal corresponding to the plurality of data tracks on the magnetic recording medium. Each magnetic head element h may be formed as already described in FIG. 12, but is formed between common substrates 1 and 10. A bias conductor 3 for each element h of the magnetic head element unit 18 for reproducing data tracks formed by a band-shaped conductive film extending and crossing all MR sensing elements 5 of all head elements h is provided on the substrate 1.

Figure 15:
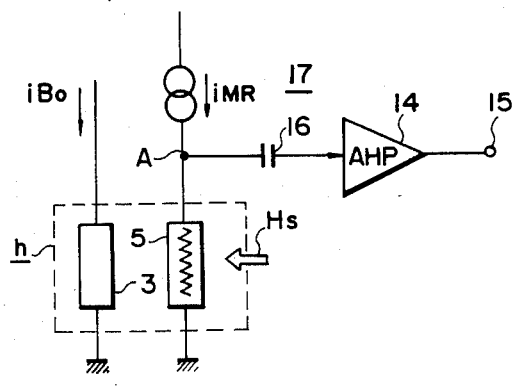
FIG. 15 is a block diagram illustrating a magnetic head apparatus of the prior art.
Figure 16:
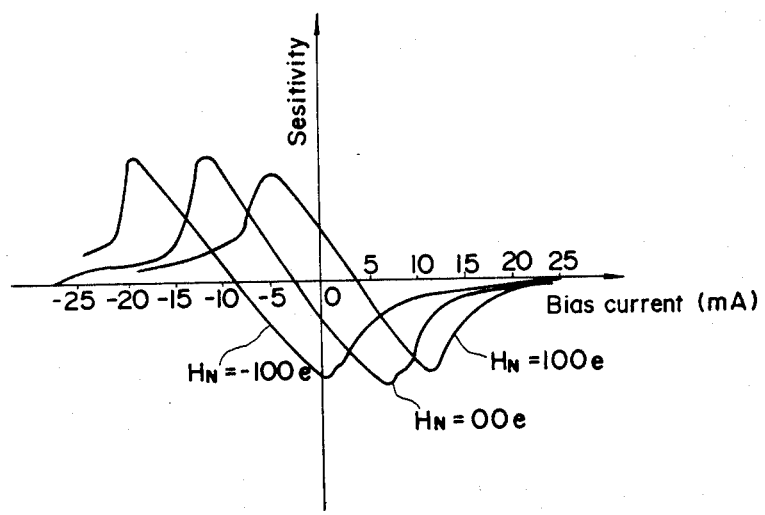
FIG. 16 is a diagram of a sensitivity characteristic curve of the magnetic head apparatus in FIG. 15.

In FIG. 1, reference numeral 17 designates a drive source in general already described in FIG. 15, including a current source to obtain sensing current $i_{MR}$ for an MR sensing element 5, a circuit for taking the reproduction output from the sensing element, i.e. a capacitor 16 accompanying each magnetic head element h, and an amplifier 14. Particularly in the invention, an external magnetic field detecting means 20 is installed at a position which is near the reproduction magnetic head element unit 18 having MR magnetic head elements h adjacent the magnetic recording medium.

The external magnetic field detecting means 20 may be formed of a pair of MR magnetic head elements $h_{S1}$ and $h_{S2}$ for detecting an external magnetic field. They are similar in construction and characteristics to the magnetic head elements h of the reproduction magnetic head element unit 18. These magnetic head elements $h_{S1}$ and $h_{S2}$ may be formed as a magnetic head element unit H and interposed between a magnetic substrate 1 and a protective substrate 10, as already described in FIG. 12. The detecting means 20 is installed as close as possible to the reproduction magnetic head element unit 18 so as to obtain the same external magnetic field $H_N$, but at a position which is not adjacent to the magnetic recording medium facing the magnetic head element unit 18 as above described. Numeral 25 designates an MR sensing element for each of the elements $h_{S1}$ and $h_{S2}$ corresponding to the MR sensing element 5 for the magnetic head element h. Numeral 23 designates schematically a bias conductor which is formed along an entire lower side of the sensing elements 25 for applying the bias magnetic field to the sensing elements 25 in common fashion, and corresponds to the bias conductor 3 formed in common fashion in the magnetic head unit 18.

Each of the sensing MR magnetic head elements $h_{S1}$ and $h_{S2}$ is grounded at one end and connected at the other end to each input side of a differential amplifier 21. Both inputs of the differential amplifier 21 are connected to a common power source $V_S$ and the MR sensing elements 25 of the head elements $h_{S1}$ and $h_{S2}$ are supplied with sensing currents $i_{S1}$, $i_{S2}$ in reverse directions from each other with respect to the common external magnetic field to be detected. An output of the differential amplifier 21 is connected to a current driver 22, and a required current $i_E$ obtained from the current driver 22 is superimposed on the bias current $i_{BO}$ leading to the bias conductor 3 of the reproduction magnetic head element 18. Thus this superposition current is supplied to the bias conductor 3. A part of the output of the differential amplifier 21 is supplied to a current driver 24, and output current from the current driver 24 is supplied to the bias conductor 23.

In this construction, when the external magnetic field $H_N$ is not applied, but each MR sensing element 5 of the magnetic head element unit 18 for reproducing data tracks is supplied with a required sensing current $i_{MR}$, the bias current $i_{BO}$ to apply the d.c. bias magnetic field from the bias conductor 3 to each sensing element 5 is set so that the optimum sensitivity and linearity can be obtained. When the external magnetic field is not applied in the detecting means 20, the MR sensing elements 25 of the head elements $h_{S1}$ and $h_{S2}$ are supplied with prescribed detecting currents $i_{S1}$ and $i_{S2}$ respectively by the power source $V_S$, and the bias magnetic field is set so that high sensitivity is obtained in each sensing element 25 itself by the magnetic field generated by flowing of the detecting current. Also in this construction, when the external magnetic field $H_N$ is not applied, the output from the differential amplifier 21 is set to zero so that output current is not obtained from the differential amplifier 21, and only the prescribed bias current $i_{BO}$ as above described is supplied to the bias conductor 3 of the reproduction magnetic head element unit 18. The prescribed sensitivity is thus obtained.

If the common external magnetic field $H_N$ is applied to the reproduction magnetic head element unit 18 and the detecting means 20 in this state, output from the differential amplifier 21 is obtained by output from each of the head elements $h_{S1}$ and $h_{S2}$ of the detecting means 20. The output from the differential amplifier 21 is supplied to the current driver 22, and a cancellation current $i_E$ for cancelling influence of the external magnetic field $H_N$ is obtained from the current driver 22. More specifically, the cancellation current $i_E$ is superimposed on the bias current $i_{BO}$ as above described, and is supplied to the bias conductor 3 of the magnetic head element unit 18 for reproducing data tracks. Thus, a variation of the magnetic field applied to each MR sensing element 5 of each magnetic head element h caused by the external magnetic field $H_N$ can be cancelled.

A part of the output from the differential amplifier 21 is introduced to the current driver 24, and a current obtained from the current driver 24 is supplied to the bias conductor 23 of the detecting means 20. Thus, an influence of the external magnetic field $H_N$ with respect to each sensing element 25 of the detecting means can be cancelled.

Although the d.c. bias magnetic field is applied to each of the MR magnetic head elements h, $h_{S1}$, $h_{S2}$ in the embodiment shown in FIG. 1, an a.c. bias magnetic field may be superimposed on the d.c. bias magnetic field as applied to the MR magnetic head element, or the a.c. bias magnetic field may be applied to the head element.

When the a.c. bias magnetic field or an a.c. bias magnetic field superimposed on the d.c. field is applied to the MR sensing element, a reduction of temperature dependence of the MR magnetic head element, an improvement of the linearity, and a decrease of the distortion results. First, this feature will be described in detail. A design wherein the a.c. bias magnetic field or an a.c. field is superimposed on the d.c. field, and wherein these fields are applied to the MR sensing element, has been already proposed in Japanese patent application No. 38980/1984 of the same inventors of the present invention, and incorporated by reference herein.

Figure 13:
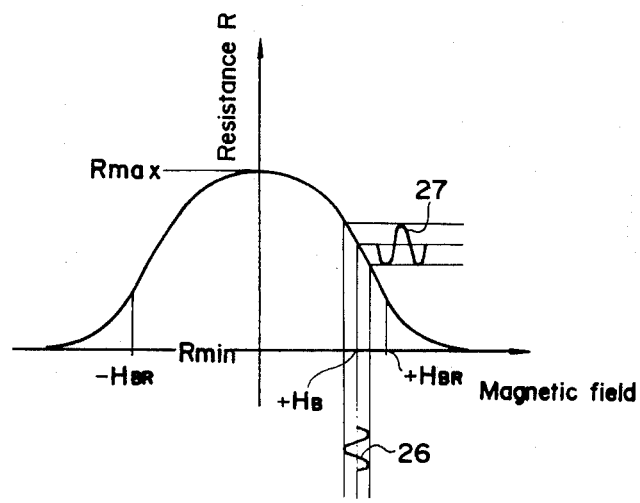
FIG. 13 is a diagram of a working characteristic curve of the magnetic head element in FIG. 12.
Figure 14:
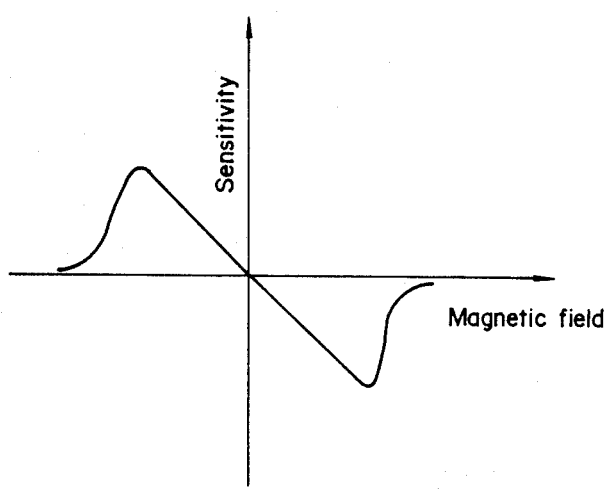
FIG. 14 is a diagram of a sensitivity characteristic curve of the magnetic head element in FIG. 12.

Working characteristics of the MR sensing element 5 will be studied again relative to FIG. 13. The prescribed bias magnetic field $H_B$ is applied to the MR sensing element as above described, and the signal magnetic field shown by numeral 26 in FIG. 13 is applied from the magnetic recording medium. Then, corresponding to the signal magnetic field, an output according to a variation of the resistance value as shown by numeral 27 in FIG. 13 is obtained. In this case, however, the greater signal magnetic field, the more the second harmonic distortion.

In the MR type magnetic head apparatus, a potential at point A of FIG. 15 is determined by a combination of a fixed component and a variable component of the resistance in the MR sensing element 5, 25. Since the fixed component in this case is about 98% and is largely dependent on temperature, the temperature drift of the potential at point A becomes large. The resistance value R in the MR sensing element is represented by the following formula.

$$R = R_0 (1 + \alpha \cos^2 \theta) \qquad (1)$$

wherein $R_0$ stands for the fixed component of resistance, $\alpha$ stands for the maximum resistance variation factor, and $\theta$ stands for the angle between the current direction and the magnetizing direction in the MR sensing element. For example, if the MR sensing element is an MR magnetic thin film of 81 Ni - 19 Fe alloy (permalloy) with a thickness of 250 Å, the measured value of $\alpha$ becomes about $\alpha = 0.017$. The value of $\alpha$ in this case is dependent more or less on the thickness or the material of the MR magnetic thin film of the MR sensing element, and becomes about $\alpha = 0.05$ at most. On the other hand, $R_0$ is represented by the following formula:

$$R_0 = R_i (1 + a\Delta_t) \qquad (2)$$

wherein $R_i$ stands for the initial value of resistance, a stands for the temperature coefficient, and $\Delta_t$ stands for the temperature variable component. The measured value of the temperature coefficient a in the above example of the MR sensing element is about $a = 0.0027/\deg$. This may produce a large noise while detecting the d.c. magnetic field.

Moreover, in such an MR type magnetic head element, since the temperature coefficient is large as described above, for example when heat generated by energizing the MR sensing element or by the bias current flowing through the bias conductor 3, 23 is radiated or transferred in an unstable manner such as by rubbing of the heat element with the magnetic recording medium, the head temperature varies, and a large noise, a so-called rubbing noise, may be produced.

If the amplifier 14 in FIG. 15 has a low-impedance input, assuming that the cut-off frequency by the capacitor 16 is fo, the required capacitance C for the capacitor 16 becomes $$C = 1/R\omega_o \qquad (3)$$

wherein $\omega_o = 2\pi fo$. If the MR sensing element is made of the permalloy with a thickness of 250 Å and a length of 50 μm, the resistance value R becomes about 120Ω. If fo=1 kHz, the value of C must be as large as C=1.3 μF. This becomes a problem particularly when the magnetic head apparatus of the multi-track type is used.

Permeability in a magnetic circuit, particularly that in the magnetic layers 7 and 8 having a relatively small thickness and sectional area, is preferably as large as possible. Since the permeability becomes maximum when the external magnetic field is zero, application of the above-mentioned bias magnetic field lowers the permeability.

The above-mentioned disadvantages can be eliminated or improved by the system as hereinafter described.

Figure 2:
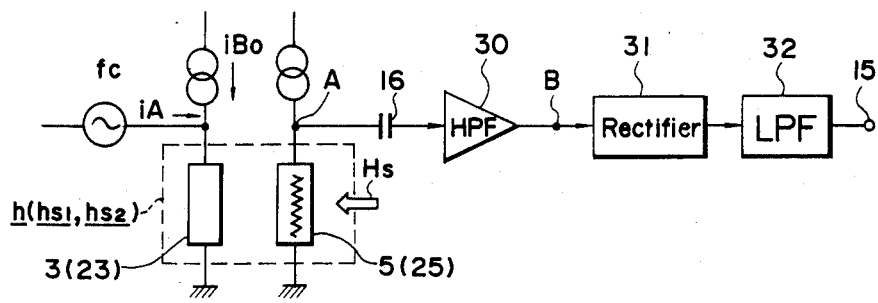
FIG. 2 is a block diagram illustrating means for applying a bias magnetic field and an example of an output circuit.
Figure 3:
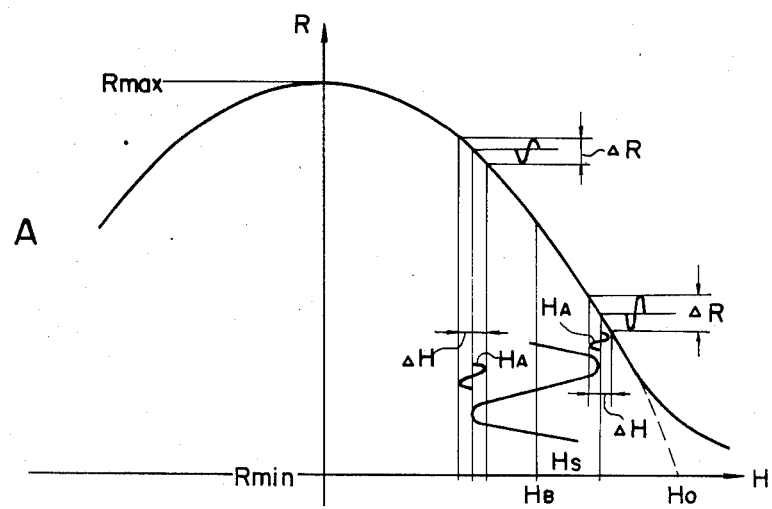
FIG. 3, consisting of A and B, is a diagram of an MR characteristic curve illustrating operation of the MR type magnetic head apparatus of the invention.
Figure 3:
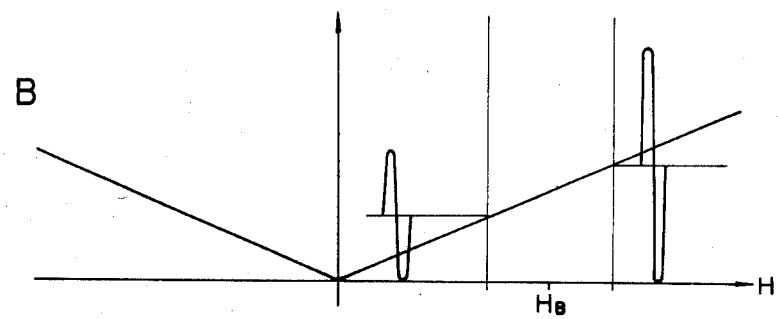

As shown in FIG. 2, a small a.c. bias current $i_A$ of high frequency fc superimposed on the d.c. bias current $i_{BO}$ flows through a bias conductor 3, 23 of a head element h. Thus, a high frequency magnetic field is applied to an MR sensing element 5, 25. In this case, the waveform of the a.c. bias current $i_A$ and hence the waveform of the a.c. magnetic field may be sinusoidal or rectangular. Thus, the MR sensing element is supplied with the a.c. bias magnetic field superimposed on the d.c. bias magnetic field. Accordingly, an a.c. signal of frequency fc is obtained across the MR sensing element, i.e. at point A in FIG. 2. FIG. 3A shows the operation when the d.c. bias magnetic field $H_B$ is a summation of the external d.c. bias magnetic field $H_{BO}$ applied to the MR sensing element from outside by the d.c. bias current $i_{BO}$ flowing through the bias conductor, and the self bias magnetic field $H_{MR}$ generated by the sensing current to the MR sensing element. The signal magnetic field $H_S$ and the a.c. bias magnetic field $H_A$ of the a.c. current $i_A$ are superimposed. If a variation $\Delta_H$ of the a.c. bias magnetic field $H_A$ is small, the amount of resistance variation $\Delta_R$ to the variation of the a.c. bias magnetic field at a given point in time is obtained as an absolute value of the differential of a curve in FIG. 3A. Since this is the differential of the parabolic curve, a variation of resistance to the amount of the total d.c. bias magnetic field $H_B$ and the signal magnetic fields $H_S$ becomes linear in principle as shown in FIG. 3B. Consequently, the amount of the a.c. signal obtained at the point A in FIG. 2 becomes an output which varies in correspondence with a sum of the total d.c. bias magnetic field $H_B$ and the signal magnetic field from the magnetic recording medium. As shown in FIG. 2, the output at the point A passes through a high pass filter 30 to pass the above-mentioned frequency component fc, and is rectified by a rectifier 31 and then passes through a low pass filter 32. Thus, the output is taken out corresponding to the signal magnetic field from the magnetic recording medium. If the final output obtained at an output terminal 15 must have the frequency band 0-100 kHz, the frequency fc of the a.c. current $i_A$ may be made much higher than the frequency band, for example fc=1 MHz. In this case, the low cutoff frequency of the high pass filter 30 is selected higher than 100 kHz and lower than fc=1 kHz, for example, to 500 kHz. An output from the high pass filter 30 is rectified by the rectifier 31 and then passes through the low pass filter 32 with the cutoff frequency 100 kHz as already described. Thus the signal of the frequency band 0-100 kHz is obtained.

Figure 4:
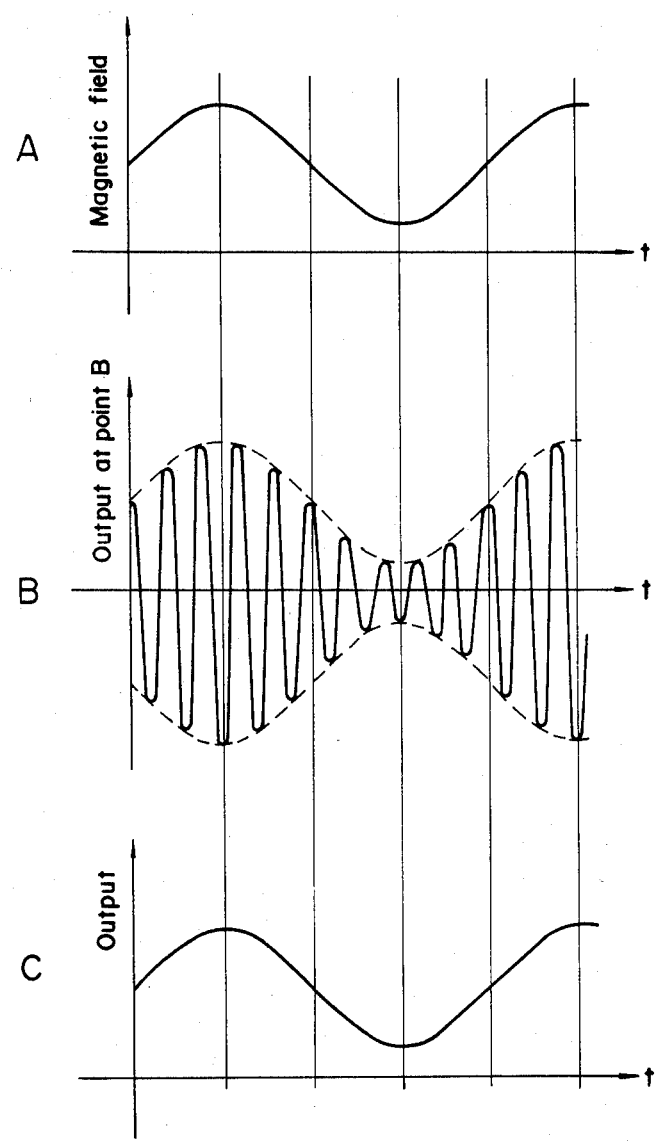
FIG. 4, consisting of A, B and C, is a waveform chart illustrating operation of the MR type magnetic head apparatus of the invention.

In the magnetic head apparatus of such a construction, if the magnetic field (signal magnetic field $H_S$+total d.c. bias magnetic field $H_B$) shown in FIG. 4A is applied to the MR sensing element, the output shown in FIG. 4B, wherein the carrier of frequency fc is amplitude-modulated by the signal, is obtained at point B in FIG. 2. An output corresponding to the signal magnetic field $H_S$ as shown in FIG. 4C is obtained at the output terminal 15.

In the magnetic head apparatus of the invention, since linear operation characteristics of the MR sensing element corresponding to the differential of the original operation characteristic curve is employed, a distortionless reproduction signal can be obtained.

Even if a fixed component of resistance of the MR sensing element is largely dependent on temperature, the operation according to the differential of the operating characteristic curve of the MR sensing element in this construction can eliminate the influence of the temperature dependence of the fixed component and reduce the temperature drift significantly.

Since the temperature dependence of the fixed component of resistance of the MR sensing element is eliminated as above described, noise caused by rubbing with the magnetic recording medium can be improved.

Furthermore, since a capacitor 16 of the invention may only pass the frequency fc, if fc=500 kHz for example, capacitance C of the capacitor 16 may be C=1600 pF. If the fc is further increased, the capacitance C may be further reduced.

Figure 5:
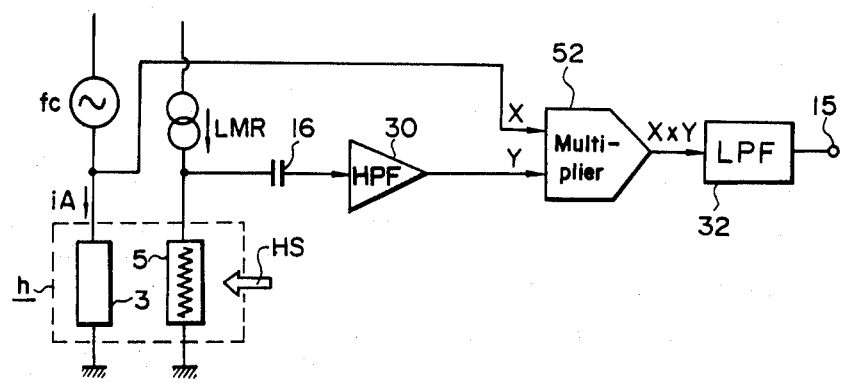
FIG. 5 is a block diagram illustrating means for applying a bias magnetic field and output circuit as employed in a second embodiment of the invention further described in FIG. 7.
Figure 6:
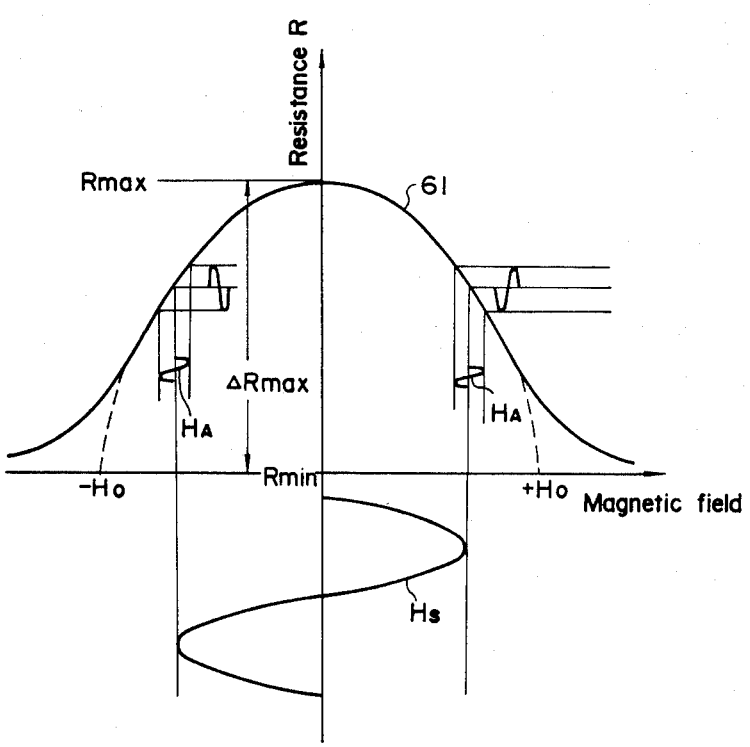
FIG. 6 is a diagram of an MR characteristic curve illustrating operation of the magnetic head apparatus in FIG. 5.

FIG. 5 is a construction diagram of an MR type magnetic head apparatus with a.c. bias, as a second embodiment of the invention. Parts in FIG. 5 corresponding to FIG. 2 are designated by the same reference numerals and the repeated description shall be omitted. In this case, a bias conductor 3, 23 is not supplied with d.c. bias current, but rather with a.c. bias current $i_A$ only. FIG. 6 shows the operation schematically. In FIG. 6, the real R-H operation characteristic curve is shown by solid line 61, an extrapolation of a parabolic curve portion of the characteristics is shown by broken lines, and the magnetic field indicating the minimum resistance value Rmin in the extraporation becomes +Ho and −Ho. As shown in FIG. 6, the a.c. bias magnetic field $H_A$ is superimposed on the signal magnetic field $H_S$ in the embodiment. A resistance variation of an MR sensing element in response to the a.c. bias magnetic field is obtained, corresponding to the polarity and the intensity of the signal magnetic field.

In this case, the MR operation characteristic curve is a parabolic curve, and the resistance value $R_{MR}$ of the MR sensing element is represented as follows:

$$R_{MR} = R\max - \Delta R\max \left(\frac{H}{H_o}\right)^2 \tag{4}$$

where $\Delta R\max = R\max - R\min$. The magnetic field H is applied to the MR sensing element. The magnetic field H is represented by the sum of the bias magnetic field $H_A(t)$ and the signal magnetic field $H_S(t)$ as follows:

$$H(t) = H_A(t) + H_S(t) \tag{5}$$

where $H_A(t)$ is generated by the bias conductor 3, 23 and is set to $$H(t) = H_A \cdot \sin(\omega_c t), \text{ and} \tag{6}$$

where $$\omega_c = 2\pi fc. \tag{7}$$

If the MR detecting current is represented by $i_{MR}$, output V(t) of the MR sensing element becomes $$V(t) = i_{MR} R_{MR}. \quad (8)$$

From the above formulas (4), (5), and (6), it follows that $$V(t) = i_{MR} \cdot R_{max} - i_{MR} \cdot \frac{\Delta R_{max}}{H_o^2} \times \quad (9)$$

$$\{H_{AO}^2 \cdot \sin^2 \omega t + 2H_{AO} \cdot H_S(t) \times \sin(\omega t) + (H_S(t))^2\}.$$

Next, the V(t) and signal having the same phase and frequency as that of the a.c. bias magnetic field $H_A$, e.g. sin ($\omega t$), are multiplied by a multiplier 52. The multiplication output Vz(t) becomes $$V_Z(t) = V(t) \cdot \sin(\omega t) \quad (10)$$

$$= i_{MR} \cdot R \, max \cdot \sin(\omega t) - i_{MR} \frac{\Delta R \, max}{H_o^2} \cdot$$

$$\{H_{AO}^2 \cdot \sin^2(\omega t) + 2H_{AO} \cdot H_S(t) \cdot \sin(\omega t) + (H_S(t))^2\} \cdot \sin(\omega t).$$

Then the output Vz passes through a low pass filter 32, and the terms having an $\omega$ component in formula (10) are eliminated. It follows therefore that $$i_{MR} \cdot R \, max \cdot \sin(\omega t) \to 0 \quad (11)$$

$$H_{AO}^2 \cdot \sin^2(\omega t) - \frac{H_{AO}}{2} \{\sin(\omega t) - \cos(2\omega t) \times \sin(\omega t)\} \to 0 \quad (12)$$

$$2H_{AO} \cdot H_S(t) \cdot \sin^2(\omega t) - H_{AO} \cdot H_S(t) \cdot \quad (13)$$

$$\{1 - \cos(2t)\} \to H_{AO} \cdot H_S(t)$$

$$\{H_S(t)\}^2 \cdot \sin(\omega t) \to 0. \quad (14)$$

Consequently, the output voltage Vo(t) obtained at a terminal 15 becomes $$V_o(5) = -i_{MR} \cdot \Delta R \, max \times \frac{H_{AO} \cdot H_S(t)}{H_o^2}. \quad (15)$$

Thus, a voltage proportional to the signal magnetic field $H_S(t)$ is obtained. Even if the signal magnetic field component $H_S(t)$ is contained in the input to the multiplier 52, is does not appear in the output in this case. Consequently, the high pass filter 30 is not necessarily always required.

According to the above construction, an output corresponding to the polarity of the external magnetic field can be obtained. In addition to advantages similar to those in the embodiment of FIG. 2, this construction is advantageous since the dynamic range becomes large. Furthermore, in this case if the magnetic bias is an a.c. component only, a decrease of permeability of the magnetic circuit caused by the d.c. bias can be avoided.

Figure 7:
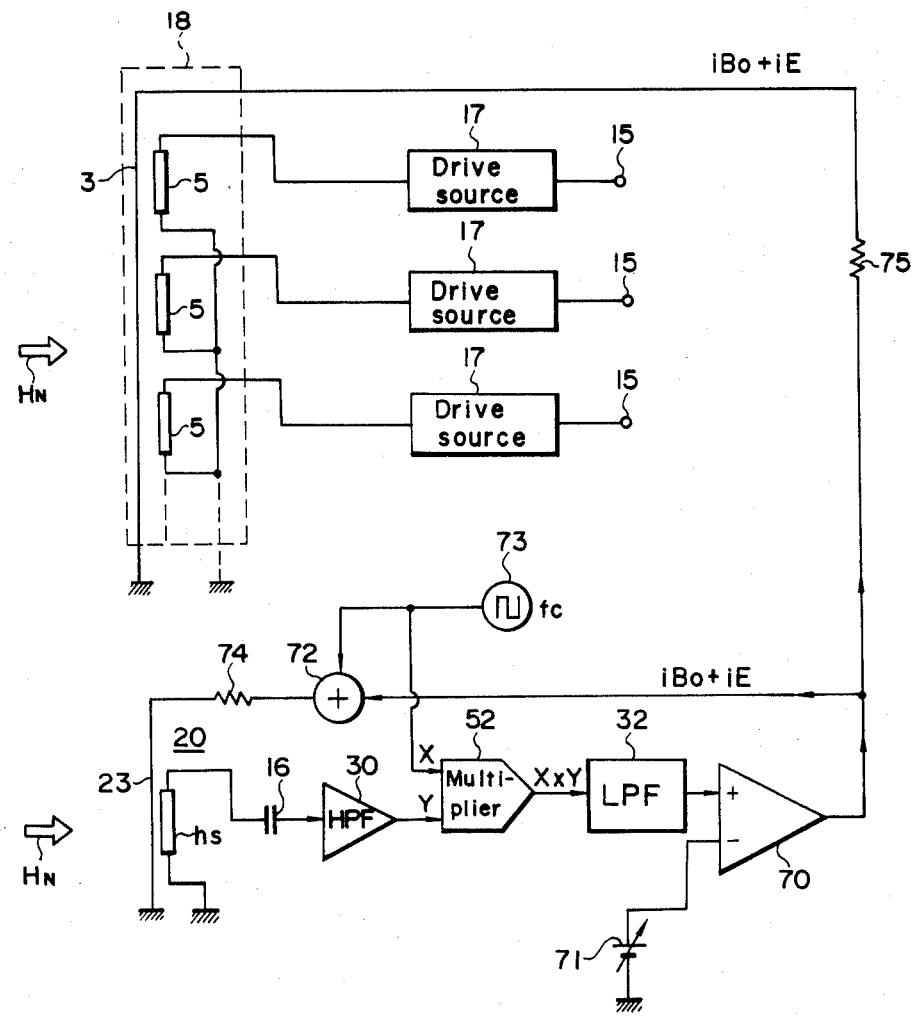
FIG. 7 is a diagram illustrating an MR type magnetic head apparatus in a second embodiment of the invention.

FIG. 7 shows an embodiment of the invention wherein the a.c. bias system described in FIG. 5 is adopted as an external magnetic field detecting means 20. In this case, the differential construction of a pair of MR magnetic head elements as described in FIG. 1 is not adopted as the MR magnetic head element for detecting the external magnetic field. Rather, it is constructed of one MR magnetic head element hs. Parts in FIG. 7 corresponding to that in FIG. 1 and FIG. 2 are designated by the same reference numerals, and the overlapped description shall be omitted.

In FIG. 7, a differential amplifier 70 is installed at the output side of the external magnetic field detecting means 20, and is set so that a required bias current $i_{BO}$ is supplied to bias conductors 3 and 23 for MR magnetic head elements h and hs in a magnetic head element unit 18 for data tracks and the external magnetic head detecting means 20, when the external magnetic field $H_N$ is not applied, by adjusting an offset means 71. Numeral 72 designates an adder, and a part of the output current from the differential amplifier 71 is added to the a.c. bias current from an a.c. bias source 73 at the adder 72, and is then supplied to the bias conductor 23. Numerals 74 and 75 designate resistors installed on current supply passages for the bias conductors 3 and 23, and the output from the differential amplifier 70 is set to the prescribed ratio by these resistors. When the external magnetic field $H_N$ is applied in this construction, the output corresponding to the external magnetic field is taken from the magnetic head element hs of the detecting means 20, and the output current corresponding to the variation of the external magnetic field $H_N$ is obtained from the differential amplifier 70. The output current from the differential amplifier 70 is supplied to the bias conductor 3 of the reproduction magnetic head element unit 18 for data tracks, and at the same time it is supplied, i.e. fed back, to the bias conductor 23 of the magnetic head element hs of the detecting means 20. Thus, a variation of the substantial bias magnetic field to the bias conductors 3 and 23 of the magnetic head elements h and hs caused by the external magnetic head element $H_N$ can be cancelled.

Figure 8:
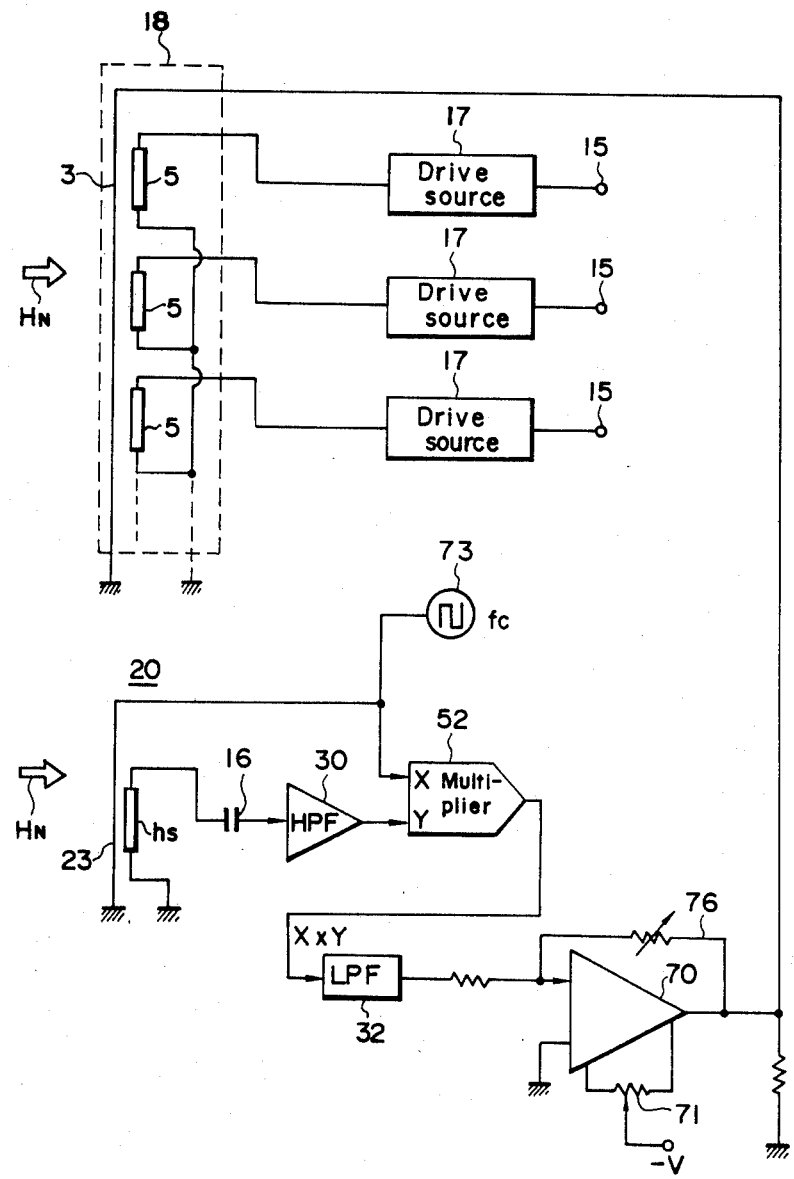
FIG. 8. is a diagram illustrating an MR type magnetic head apparatus in a third embodiment of the invention.

In the embodiment of FIG. 7, an output from the differential amplifier 70 is fed back to the magnetic head element hs for detecting the external magnetic field. However, if the differential amplifier 70 is provided in itself with a gain adjusting means 76 based on its own output as shown in FIG. 8, the feedback path for the head element hs may be omitted. Parts in FIG. 8 corresponding to that in FIG. 7 are designated by the same reference numerals, and the overlapped description shall be omitted.

Figure 9:
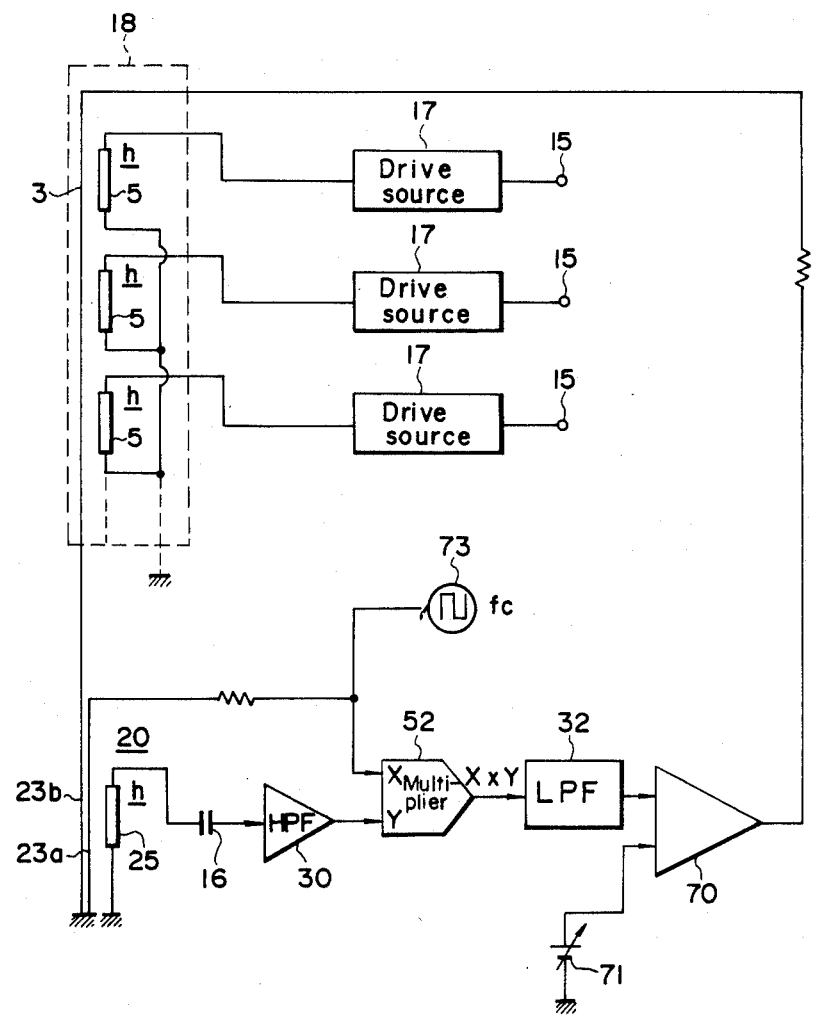
FIG. 9 is a diagram illustrating an MR type magnetic head apparatus in a fourth embodiment of the invention.

FIG. 9 shows still another embodiment of the invention. Parts in FIG. 9 corresponding to that in FIG. 7 are designated by the same reference numerals, and the overlapped description shall be omitted. In a magnetic head element hs for detecting the external magnetic field of an external magnetic field detecting means 20 in the embodiment, in addition to a bias conductor 23a for applying an a.c. bias magnetic field to an MR sensing element 25, a bias conductor 23b extending from a bias conductor 3 in a magnetic head element h for reproducing data tracks is provided. Thus, the bias variation to the MR sensing element 25 caused by the external field $H_N$ can be cancelled. Accordingly, the feedback circuit for the magnetic head element hs may be omitted in a manner similar to FIG. 8.

Figure 10:
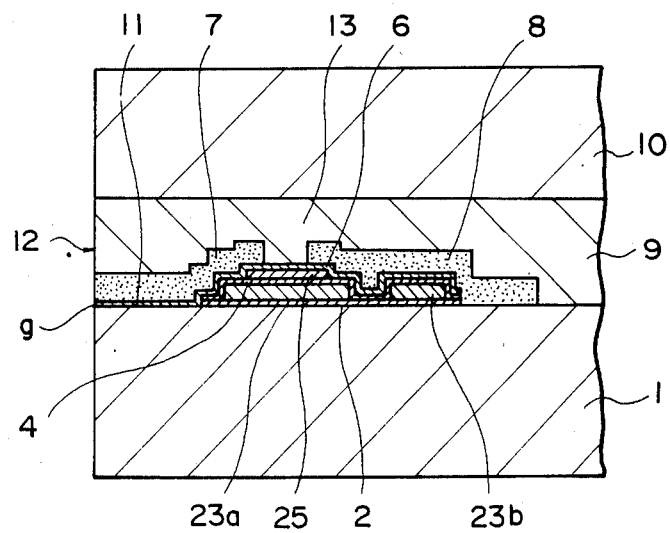
FIG. 10 is a schematic enlarged sectional view of a magnetic head element for detecting an external field.

In the magnetic head element hs for detecting the external magnetic field in this case, the bias conductors 23a and 23b are arranged across the MR sensing element 25 and the magnetic layer 8 to construct the magnetic circuit for the head element hs as shown. in FIG. 10. Parts in FIG. 10 corresponding to that in FIG. 12 are designated by the same reference numerals, and the overlapped description shall be omitted.

Figure 11:
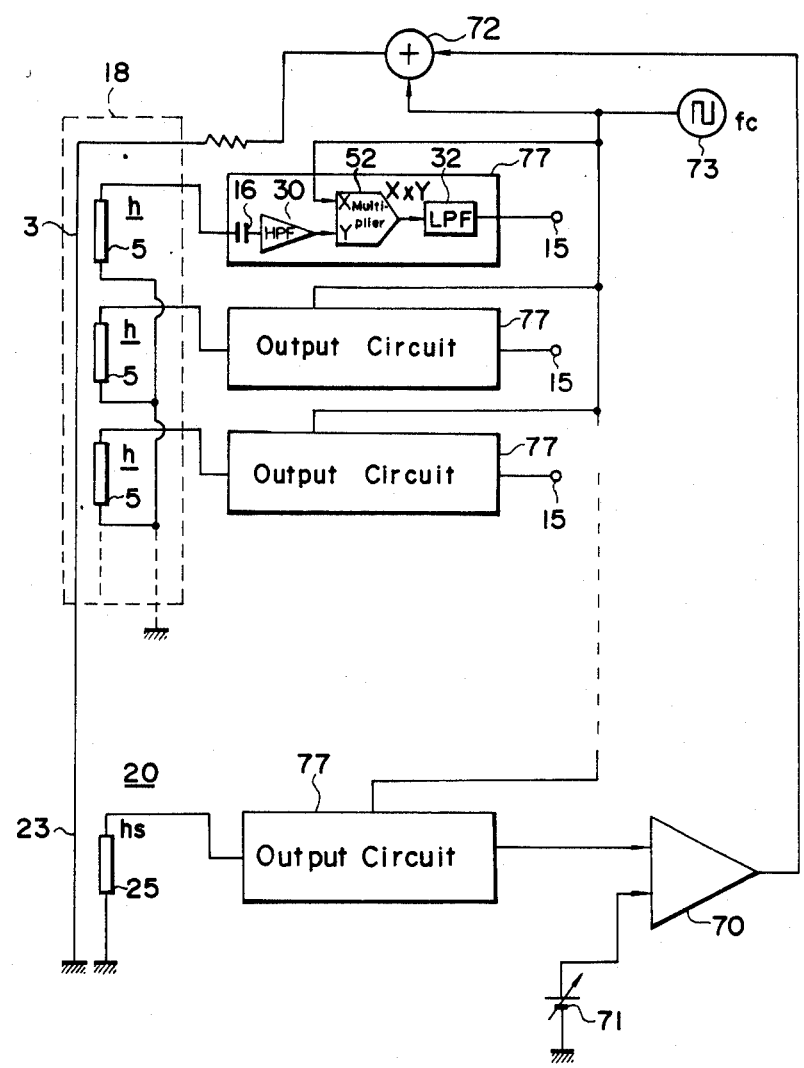
FIG. 11 is a diagram illustrating an MR type magnetic head apparatus in a fifth embodiment of the invention.

FIG. 11 is a diagram illustrating construction of another embodiment of the invention. In the embodiment, an a.c. bias magnetic field is applied also to an MR magnetic head element h of each track of a magnetic head element unit 18 for reproducing data tracks. Parts in FIG. 11 corresponding to that in FIG. 7 are designated by the same reference numerals, and the overlapped description shall be omitted. In FIG. 11, numeral 77 designates an output circuit corresponding to each of the MR magnetic head elements h and hs. A bias conductor 23 of the magnetic head element hs for detecting the external field extends from a bias conductor 3 of the magnetic head element unit 18 for reproducing data tracks, and both are connected electrically in common.

Figure 17:
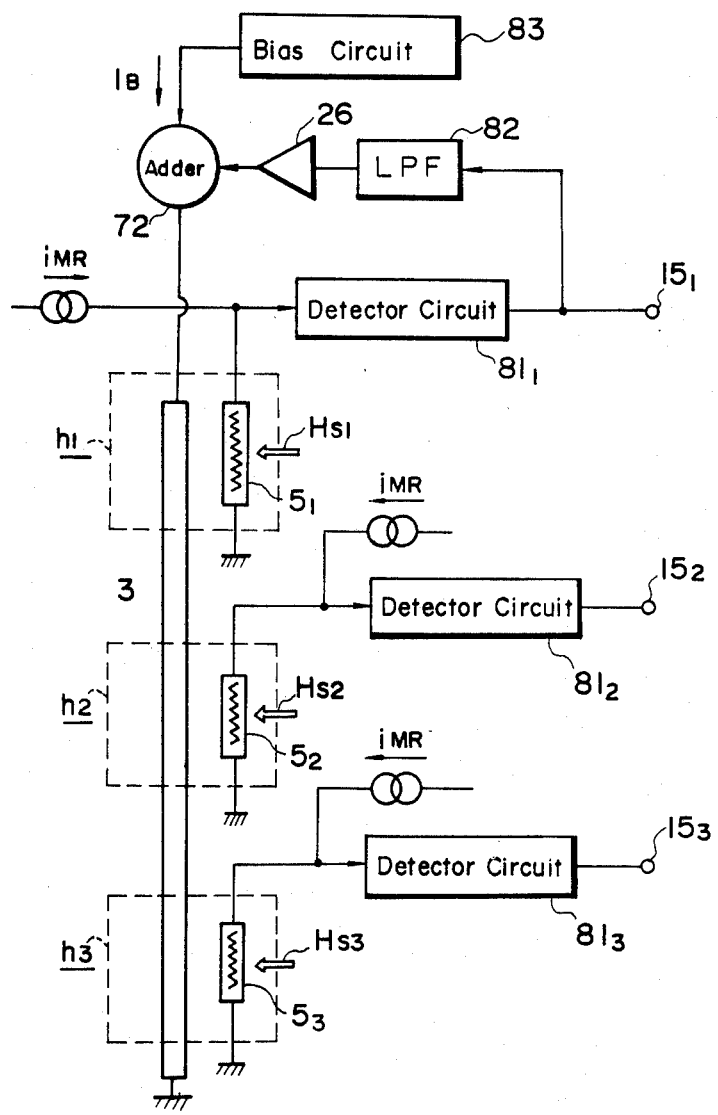
FIG. 17 is a diagram illustrating an MR type magnetic head apparatus as a sixth embodiment of the invention.

Another embodiment of the invention will now be described in detail, referring to FIG. 17. The embodiment relates to a multi-channel MR type magnetic head apparatus. In FIG. 17, symbols $h_1$, $h_2$, $h_3$, . . . designate head elements of respective channels. Each of the detecting circuits $81_1$, $81_2$, $81_3$, . . . detects a detecting signal corresponding to a signal magnetic field (e.g. analog audio signal of 0-40 kHz) from an output of each of the MR sensing elements $5_1$, $5_2$, $5_3$, . . . of the head elements $h_1$, $h_2$, $h_3$, . . . Numerals $14_1$, $15_2$, $15_3$, . . . designate output terminals of the detecting circuits $81_1$, $81_2$, $81_3$, . . . respectively.

Figure 12:
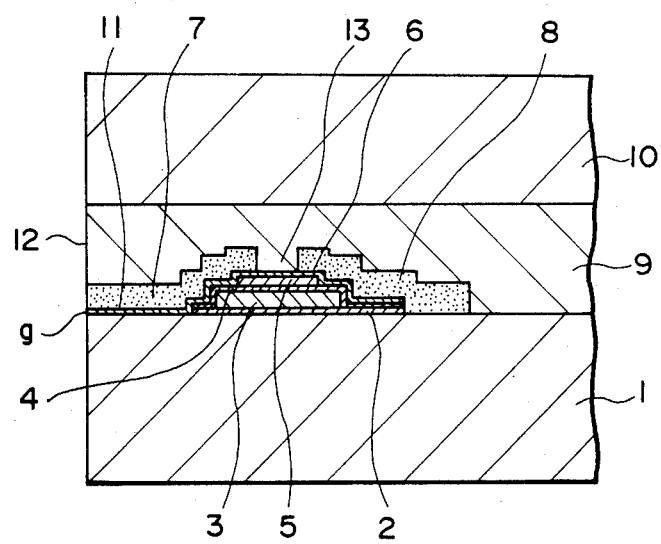
FIG. 12 is a schematic enlarged sectional view of an example of an MR magnetic head element.

A structure of each of the head elements $h_1$, $h_2$, $h_3$, . . . is similar to FIG. 12, but a bias conductor 3 is commonly employed. A bias current source 83 supplies the bias conductor 3 with d.c. and/or a.c. (sinusoidal or rectangular) bias current $I_B$.

Thus when the bias magnetic field $H_B$ formed of a magnetic field generated by d.c. current $i_B$ flowing through the bias conductor 3 and magnetic field generated by sensing current $i_{MR}$ flowing through the MR sensing elements $5_1$, $5_2$, $5_3$, . . . is applied to the MR sensing elements $5_1$, $5_2$, $5_3$, . . . , the signal magnetic field $H_S$ is applied thereto.

A part of a detecting signal of any channel, for example, the detecting circuit $81_1$ of the first channel, is supplied to a low pass filter 82 to pass a signal component of 0–20 Hz, and an output of the low pass filter 82 is supplied to a current driver (high gain amplifier) 26. An output current of the current driver 26 and the bias current are supplied to an adder 72, and the added current flows through the bias conductor 3. In this case, current flowing through the bias conductor 3 based on an output of the low pass filter 82, is set to a polarity and level so as to cancel the external magnetic field applied to the MR sensing elements $5_1$, $5_2$, $5_3$, . . . .

Thus, even if the external magnetic field is applied to the MR sensing elements $5_1$, $5_2$, $5_3$, . . . , it may be cancelled by the cancelling magnetic field from the bias conductor 3. Since a signal component of less than 20 Hz in the detecting signal is unnecessary, a lack of such a signal component in the detecting signal is not a problem.

A plurality of detecting signals may be supplied to the low pass filter and outputs thereof can be added so that a current based on the added output flows through the bias conductor 3, and the external magnetic field is cancelled.

Another embodiment of the invention will be described, referring to FIG. 18. In the embodiment, a pair of MR sensing elements 5a, 5b in a series connection are installed as an MR sensing element of a head element h, the connection neutral point is grounded, and the sensing current $i_{MR}$ flows from each end. The signal magnetic field $H_S$ is applied to the MR sensing elements 5a, 5b using self bias, and the differential outputs are obtained from each end and supplied to non-inversion and inversion input terminals of a differential amplifier 86. A detecting signal corresponding to the signal magnetic field, for example an audio signal at a frequency band of 0-40 kHz, is obtained at an output terminal 15.

The detecting signal from the output terminal 15 flows through a low pass filter 82 which allows the 0-20 Hz component to pass, and then it is supplied to a current driver (high gain amplifier) 26. Current from the current driver 26 flows through a conductor 29 for generating the cancelling magnetic field. The current flowing through the conductor 29 is set to a polarity and level such that it cancels the external magnetic field applied to the MR sensing elements 5a, 5b.

Figure 18:
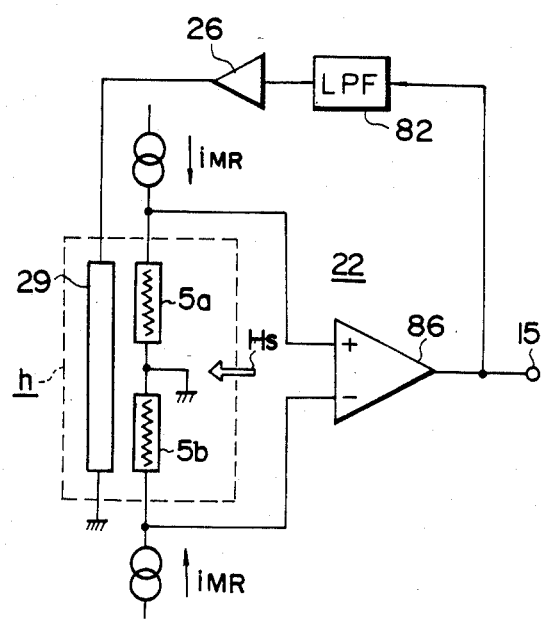
FIG. 18 is a diagram illustrating construction of an MR type magnetic head apparatus as a seventh embodiment of the invention.

In the embodiment of FIG. 18, one of the MR sensing elements 5a, 5b may be installed at a position at which the magnetic field is not applied in order to effect the temperature compensation of the other sensing element.

Still another embodiment of the invention will now be described, referring to FIG. 19. A rectangular wave oscillator 73 generates a rectangular wave signal having a frequency which is more than three times a maximum frequency of the signal magnetic field, and the rectangular wave signal from the oscillator 73 is supplied to a current driver 27. A rectangular wave bias current from the current driver 27 flows through a bias conductor 3 of a head element h.

An output from an MR head element 5 is supplied to the cascade circuit of a capacitor 16 and an amplifier 14. An output of the cascade circuit is supplied to an inverter 83. An output of the amplifier 14 and the inverter 83 is changed by a switch 84 which is changed and controlled by the rectangular wave signal from the rectangular wave oscillator 73. The changing output is supplied to a low pass filter 85, thereby detecting a signal corresponding to the signal magnetic field Hs. For example, an audio signal in the frequency band of 0-40 kHz is obtained at an output terminal 15.

The detecting signal is supplied to a low pass filter 82 which allows the signal component of 0-20 Hz to pass, and an output of the low pass filter 82 is supplied to a current driver (high gain amplifier) 26. An output current of the current driver 26 is added to the rectangular wave bias signal from the current driver 27 at an adder 72, and the added current flows through a bias conductor 3. The current from the current driver 26 is set to a polarity and level so as to cancel the external magnetic field applied to the MR sensing element 5.

Figure 19:
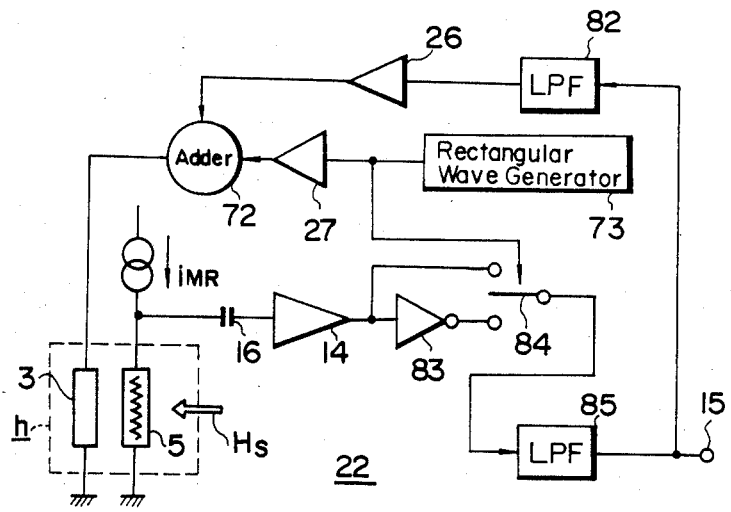
FIG. 19 is a diagram illustrating construction of an MR type magnetic head apparatus as an eighth embodiment of the invention.

In the embodiment of FIG. 19, a sinusoidal wave oscillator may be used in place of the rectangular wave oscillator 73. In this case, the construction of the inverter 83 and the switch 84 may be replaced by a multiplier. The output of a high pass filter installed in place of the amplifier 14, and the sinusoidal wave signal, are multiplied. The multiplied signal is supplied to a low pass filter 85.

The reproduction signal may be an audio/video/data signal in an analog/digital system.

According to the present invention as above described, the external magnetic field detecting means 20 is installed near the magnetic head element 18 for reproducing data tracks at substantially the same condition as that of the magnetic head element 18 so as to receive the undesired external magnetic field $H_N$. In this construction, since the amount of current to the bias conductor 3 of the magnetic head element 18 for reproducing data tracks is controlled, and a variation of a bias state of each magnetic field caused by the unneeded magnetic field $H_N$ is eliminated, the apparatus can be always operated at the stable state with the best sensitivity and linearity.

Although various minor changes and modifications might be proposed by those skilled in the art, it will be understood that we wish to include within the claims of the patent warranted hereon all such changes and modifications as reasonably come within our contribution to the art.

We claim as our invention:

1. A magnetoresistance effect type magnetic head apparatus, comprising:
   a magnetic head element including a sensing element having a magnetoresistance effect and a bias conductor means for applying a bias magnetic field to said sensing element for reproducing a recording signal on a magnetic recording medium adjacent the magnetic head element;
   detecting means for detecting an external magnetic field which effects said magnetic head element;
   bias means for introducing a current through said bias conductor means; and
   means connecting an output of the detecting means to said bias means so as to control the current in said bias conductor means and thus control the bias magnetic field.

2. A magnetic head apparatus according to claim 1 wherein said detecting means comprises means for extracting a relatively low frequency signal component corresponding to said external magnetic field and creating a correction signal therefrom which is superimposed on the current flowing in said bias conductor means of said magnetic head element.

3. A magnetic head apparatus according to claim 1 wherein said detecting means comprises an additional magnetic head element with a sensing element having a magnetoresistance effect.

4. A magnetoresistance effect type magnetic head apparatus, comprising:
   a magnetic head element including a sensing element having a magnetoresistance effect and a bias conductor means for applying a bias magnetic field to said sensing element for reproducing a record signal on a magnetic recording medium adjacent the magnetic head element;
   detecting means for detecting an external magnetic field which effects said magnetic head element;
   bias means for introducing a current through said bias conductor means;
   means connecting an output of the detecting means to said bias means so as to control the current in said bias conductor means and thus control the bias magnetic field;
   said detecting means comprising an additionally magnetic head element with a sensing element having a magnetoresistance effect; and
   said addition magnetic head element comprising first and second magnetoresistance effect sensing elements.

5. A magnetic head apparatus according to claim 4 wherein a differential amplifier has first and second inputs respectively connected to the respective first and second sensing elements, wherein a bias conductor means for applying a bias magnetic field to the first and second sensing elements is provided, and wherein an output of the differential amplifier connects through an amplifier to supply bias current to the bias conductor means of the additional magnetic head element and also connects through an amplifier to supply a correcting bias current which is superimposed on a bias current feeding the bias conductor means of the magnetic head element.

6. A magnetic head apparatus according to claim 1 wherein said detecting means comprises an additional magneto effect sensing element positioned to detect the external magnetic field but at a distance sufficient to prevent substantial influencing by a signal magnetic field created by said recording signal.

7. A magnetoresistance effect type magnetic head apparatus, comprising:
   a magnetic head element including a sensing element having a magnetoresistance effect and a bias conductor means for applying a bias magnetic field to said sensing element for reproducing a recording signal on a magnetic recording medium adjacent the magnetic head element;
   detecting means for detecting an external magnetic field which effects said magnetic head element;
   bias means for introducing a current flow through said bias conductor means;
   said detecting means comprising an additional magnetic head element including a sensing element having a magnetoresistance effect and a bias conductor means for applying a bias magnetic field to said sensing element of the additional magnetic head element, the additional magnetic head element being positioned so as to detect the external magnetic field but without substantially detecting a signal magnetic field from the recording signal on a free magnetic recording medium; and
   means being provided for connecting the additional magnetic head element sensing element such that a correction signal produced thereby can be superimposed on the current flowing through said bias conductor means of said sensing element of the magnetic head element, whereby effects of the external magnetic field on the magnetic head element are substantially eliminated.

8. A magnetoresistance effect type magnetic head apparatus, comprising:
   a magnetic head element including a sensing element having a magnetoresistance effect and an adjacent bias conductor means for applying a bias magnetic field to said sensing element for reproducing a recording signal on a magnetic recording medium adjacent the magnetic head element;
   output circuit means connected to the sensing element for outputting the recording signal on the magnetic recording medium;
   an additional magnetic head element including a sensing element having a magnetoresistance effect and an associated bias conductor means for applying a bias magnetic field to said sensing element for producing a signal corresponding to an external magnetic field effecting the magnetic head element but substantially not responsive to a signal magnetic field caused by the recording signal on the magnetic recording medium;
   a bias source connected to the bias conductor means of the additional magnetic head element;
   a multiplier having a first input connected to the additional head element bias source and a second input connected to the additional head element sensing element;

an output of the multiplier connecting to a low pass filter means for deriving a signal corresponding to said external magnetic field; and means for combining the external magnetic field signal with a bias and providing an output bias to said adjacent bias conductor means of said magnetic head element.

9. A magnetic head apparatus according to claim 8 wherein an adder means has an output connected to the bias source means for the magnetic head element and has a first input connected to an AC bias source and a second input connected to an output of a differential amplifier, the differential amplifier having its first input connected to said low pass filter means and a second input connected to a voltage source.

10. A magnetic head apparatus according to claim 8 wherein the low pass filter means connects to a first input of an amplifier, said amplifier having a resistive feedback loop, and an output of the amplifier connecting to the bias conductor means of the magnetic head element.

11. A magnetoresistance effect type magnetic head apparatus comprising:

a magnetoresistance effect first sensing element for sensing a signal magnetic field from a magnetic recording medium adjacent the sensing element;

a magnetoresistance effect second sensing element positioned for sensing an external field effecting said first sensing element but substantially not the signal magnetic field;

a common bias conductor means running adjacent both the first sensing element and second sensing element;

an additional bias conductor means running adjacent the second sensing element;

an output of the second sensing element connecting to a first input of a multiplier, a second input of the multiplier connecting to an AC bias source which also connects to the additional bias conductor means;

an output of the multiplier connecting through a low pass filter means for deriving an output signal indicative of the external field; and means for connecting an output of the low pass filter means together with a DC bias source to the common bias conductor means.

12. A magnetoresistance effect type magnetic head apparatus, comprising:

a magnetoresistance effect first sensing element for sensing a signal magnetic field from a magnetic recording medium adjacent the first sensing element;

a second magnetoresistance effect sensing element for sensing an external field effecting the first sensing element but which does not substantially sense the signal magnetic field;

bias conductor means for applying a bias magnetic field to both the first and second sensing elements;

a first output circuit connecting to the first sensing element and a second output circuit connecting to the second sensing element;

an output of the second output circuit connecting through a combining means for combining the output with a d.c. bias offset, an output of the combining means connecting to a first input of an adder, a second input of the adder connecting to an a.c. bias source; and an output of the adder connecting to the bias connector means.

13. A magnetoresistance effect type magnetic head apparatus, comprising:

a magnetoresistance effect sensing element for sensing a signal magnetic field;

bias means for applying a bias magnetic field to said magnetoresistance effect sensing element;

detecting circuit means for obtaining a detecting signal in a frequency band from d.c. to a first prescribed frequency $F_1$ corresponding to the signal magnetic field;

low pass filter means for deriving an unwanted signal component of said detecting signal in a frequency band from d.c. to a second prescribed frequency $F_2$, where $F_2 < F_1$; and means for applying a cancelling magnetic field to said magnetoresistance effect sensing means for cancelling an external magnetic field in correspondence with an output from said low pass filter means.

14. A magnetic head apparatus according to claim 13 wherein said detecting circuit means connects to an output of the sensing element, and wherein the low pass filter means connects between an output of the detecting circuit means and said bias means such that the unwanted signal component in said frequency band from d.c. to the second prescribed frequency $F_2$, and which corresponds to the external magnetic field, is superimposed on a current flowing in a bias conductor associated with said bias means and substantially cancels effects of the external magnetic field in the magnetoresistance effect sensing element.

15. A magnetic head apparatus according to claim 14 wherein an adder means is provided between an output of the low pass filter means and a bias circuit which supplies bias to the bias conductor.

16. A magnetoresistance effect type magnetic head apparatus, comprising:

a first magnetoresistance effect sensing element for sensing a signal magnetic field;

a second magnetoresistance effect sensing element positioned for temperature sensing;

bias conductor means common to both the first and second magnetoresistance effect sensing elements;

a differential amplifier having first and second inputs respectfully connected to the first and second sensing elements;

an output of the differential amplifier connecting through a low pass filter means for generating an output signal corresponding to an external magnetic field to which the sensing element is subjected; and means connecting an output of the low pass filter means to the common bias conductor means.

17. A magnetoresistance effect type magnetic head apparatus, comprising:

a magnetoresistance effect sensing element positioned for sensing a signal magnetic field;

bias conductor means adjacent the sensing element;

inverter means connecting to an output of the magnetoresistance effect sensing element;

switch means for selectively connecting to either an output of the inverter or an input of the inverter, said switch means being controlled by wave generator means; and an output of the switch means connecting to a low pass filter means for deriving an output signal corresponding to an external magnetic field to which the sensing element is subjected, an output of the low pass filter means connecting to a first input of an adder means for creating a bias current which is connected to the bias conductor means, said adder means having at a second input an output of the wave generator means.

* * * * *